US012371342B2

(12) United States Patent
Kazama et al.

(10) Patent No.: US 12,371,342 B2
(45) Date of Patent: Jul. 29, 2025

(54) WURTZITE-TYPE MANGANESE OXIDE PARTICLES AND METHOD FOR PRODUCING SAME

(71) Applicant: STANLEY ELECTRIC CO., LTD., Tokyo (JP)

(72) Inventors: Takuya Kazama, Tokyo (JP); Wataru Tamura, Tokyo (JP); Yasuyuki Miyake, Tokyo (JP); Kenji Moriyama, Tokyo (JP); Atsushi Muramatsu, Miyagi (JP); Kiyoshi Kanie, Miyagi (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 584 days.

(21) Appl. No.: 17/775,799

(22) PCT Filed: Nov. 9, 2020

(86) PCT No.: PCT/JP2020/041704
§ 371 (c)(1),
(2) Date: May 10, 2022

(87) PCT Pub. No.: WO2021/095682
PCT Pub. Date: May 20, 2021

(65) Prior Publication Data
US 2022/0388862 A1 Dec. 8, 2022

(30) Foreign Application Priority Data
Nov. 13, 2019 (JP) ................................. 2019-205644

(51) Int. Cl.
*C01G 45/02* (2025.01)
(52) U.S. Cl.
CPC .......... *C01G 45/02* (2013.01); *C01P 2002/30* (2013.01); *C01P 2002/77* (2013.01);
(Continued)

(58) Field of Classification Search
CPC .. C01G 45/02; C01P 2002/30; C01P 2002/77; C01P 2004/32; C01P 2004/64; C01P 2004/86
See application file for complete search history.

(56) References Cited

U.S. PATENT DOCUMENTS

| 6,136,287 A | 10/2000 | Horne et al. |
| 9,334,580 B2 | 5/2016 | Yoshida et al. |

FOREIGN PATENT DOCUMENTS

| CN | 101104949 A | 1/2008 |
| CN | 107441512 A | 12/2017 |

(Continued)

OTHER PUBLICATIONS

Ki Min Nam et al, "New Crystal Structure: Synthesis and Characterization of Hexagonal Wurtzite MnO", 2012, Journal of the American Chemical Society, 134, 8392-8395.*

(Continued)

*Primary Examiner* — Michael Forrest
*Assistant Examiner* — Nicole Lee Quist
(74) *Attorney, Agent, or Firm* — Holtz, Holtz & Volek PC (57) ABSTRACT

Single-phase manganese oxide particles having a wurtzite crystal structure. The particles can be obtained by thermally decomposing a compound containing manganese. In this procedure, a reducing agent consisting of at least one of a polyol-based material and an ethylene glycol stearate-based material is added as an additive to the reaction system. It is heated at a first temperature (200° C. or lower) under a reduced pressure atmosphere, then the temperature is raised, and the product is heated at a temperature higher than the first temperature under an inert gas atmosphere.

17 Claims, 12 Drawing Sheets

(52) U.S. Cl.
CPC ...... *C01P 2004/32* (2013.01); *C01P 2004/64* (2013.01); *C01P 2004/86* (2013.01)

(56) References Cited

FOREIGN PATENT DOCUMENTS

| | | |
|---|---|---|
| JP | 2002529352 A | 9/2002 |
| JP | 2011207674 A | 10/2011 |
| JP | 2015010033 A | 1/2015 |
| JP | 5827950 B2 | 10/2015 |
| KR | 20120021632 A | 3/2012 |

OTHER PUBLICATIONS

Ki Min Nam, "Supporting Information—New Crystal Structure: Synthesis and Characterization of Hexagonal Wurtzite MnO", Journal of the American Chemical Society, 2012, 134, S1-S16.*

Ki Min Nam, "New Crystal Structure: Synthesis and Characterization of Hexagonal Wurtzite MnO", Journal of the American Chemical Society, 2012, 134, 8392-8395.*

A.V. Radhamani, "ZnO@MnO2 Core-Shell Nanofiber Cathodes for High Performance Asymmetric Supercapacitors", ACS Applied Material and Interfaces, 2016, 8, 30531-30542.*

Zhongwu Wang, "Morphology-tuned wurtzite-type ZnS nanobelts", Nature Materials, Dec. 2005, 4, 922-927.*

Jie Cao, "Fabrication of $β$-MnO2/$α$-MnO2 hollow core/shell structures and their application to water treatment", Journal of Materials Chemistry, 2011, 21, 16210-16215.*

International Search Report (ISR) (and English language translation thereof) dated Jan. 12, 2021, issued in International Application No. PCT/JP2020/041704.

Written Opinion dated Jan. 12, 2021, issued in International Application No. PCT/JP2020/041704.

Nam, et al., "Chemical Approach to a New Crystal Structure: Phase Control of a Manganese Oxide on a Carbon Sphere Template," Chemistry an Asian Journal, vol. 9, 2014, pp. 3525-3532.

Nam, et al., "Non-native transition metal monoxide nanostructures: unique physicochemical properties and phase transformations of CoO, MnO, and ZnO," NPG Asia Materials, vol. 9, 2017, e364.

Nam, et al., "New Crystal Structure: Synthesis and Characterization of Hexagonal Wurtzite MnO", Journal of the American Chemical Society, vol. 134, 2012, pp. 8392-8395.

Extended European Search Report (EESR) dated Nov. 23, 2023, issued in counterpart European Application No. 20887728.2.

International Preliminary Report on Patentability (IPRP) (and English language translation thereof) dated May 17, 2022, issued in counterpart International Application No. PCT/JP2020/041704.

* cited by examiner

WURTZITE-TYPE MANGANESE OXIDE PARTICLES AND METHOD FOR PRODUCING SAME

TECHNICAL FIELD

The present invention relates to novel wurtzite-type manganese oxide particles useful as catalysts, materials for lithium batteries, contrast agents for MRI (magnetic resonance imaging), optoelectronics by photoelectric conversion, electronic materials, and the like, and a method for producing the same.

BACKGROUND ART

Many transition metal oxides such as manganese oxide exist stably in a rock salt type crystal structure. As a crystal structure that a metal oxide can take, there is a wurtzite type in addition to a rock salt type, and since the two have different crystal symmetries, their electrical, magnetic, or optical properties are different. Due to its asymmetry, wurtzite-type metal oxides are materials with characteristics such as high conductivity, piezoelectric effect, pyroelectric effect, and second harmonic generation, which were not obtained with rock salt type structures, and thus, can be expected to be applied in various fields.

It is known that some of the transition metal oxides, such as zinc oxide, also exist in a stable wurtzite crystal structure, but in the case of other oxides, although it has been shown to be theoretically possible to have a wurtzite crystal structure, no method has been established for producing an oxide having a stable wurtzite crystal structure.

Non-PTL 1 discloses a method for producing manganese oxide particles on a carbon template by a template method. In this method, carbon particles each having a diameter of about 500 nm are used as a template, and wurtzite manganese oxide particles are grown on the carbon particles. It has been reported that this results in a structure in which manganese oxides are aggregated on the surface of carbon particles.

On the other hand, PTL 1 discloses manganese oxide particles having a hexagonal system or a crystal structure similar to a hexagonal system and a method for producing the same, but the manganese oxide particles disclosed therein are not a wurtzite-type manganese oxide containing manganese and oxygen at a ratio of 1:1.

CITATION LIST

Non-Patent Literature

Non-PTL 1: Ki Min Nam, et al., J. Am. Chem. Soc. 2012, 134, pp. 8392-8395

Patent Literature

PTL 1: JP-B-5827950

SUMMARY OF INVENTION

Technical Problem

In order to apply stable wurtzite-type manganese oxide particles to various uses, it is preferable to obtain manganese oxide particles alone, but as described above, in the template method described in Non-PTL 1, since the form of a combination of the carbon template and manganese oxide particles is obtained, it is difficult to isolate the manganese oxide particles, and it is not possible to obtain single-phase manganese oxide particles. Furthermore, it has been reported that, in general, the characteristics of metal oxide particles change by controlling the particle size, and for example, by making nanoparticles of several tens of nm or less, a single wavelength energy gap and quantum effects appear. However, in the method described in Non-PTL 1, the particle size of the manganese oxide particles depends on the particle size of the template particles, and it is difficult to produce nano-sized particles.

An object of the present invention is to provide a method for producing stable wurtzite-type manganese oxide particles by a thermal decomposition method without using a template, and novel wurtzite-type manganese oxide particles obtained by the method.

Solution to Problem

The present inventors have reached the present invention by finding that it is possible to stably produce wurtzite-type manganese oxides by adding a specific additive, performing the reaction steps in multiple stages, and appropriately controlling the reaction conditions of each step, when producing manganese oxides by a thermal decomposition method.

That is, the present invention provides novel single-phase wurtzite-type manganese oxide (MnO) particles, and the wurtzite-type manganese oxide particles have lattice constants of a=3.37±0.01 Å and c=5.38±0.01 Å. The particle size can be made to 100 nm or less.

The wurtzite-type manganese oxide particles of the present invention have a red color and an absorption edge of 600 nm (2.1 eV) or less.

Further, the present invention provides core-shell type manganese oxide particles each having a single-phase wurtzite-type manganese oxide particle as a core and coated with manganese dioxide.

The method for producing wurtzite-type manganese oxide particles of the present invention is a method for producing manganese oxide particles by thermally decomposing a compound containing manganese and includes a first step of adding a reducing agent consisting of at least one of a polyol-based material and an ethylene glycol stearate-based material as an additive in the reaction system and heating it at a first temperature under a reduced pressure atmosphere, and a second step of raising the temperature after the first step and heating it at a temperature higher than the first temperature under an inert gas atmosphere. As the additive, it is preferable to include a second additive that further suppresses the particle size in addition to the reducing agent.

Advantageous Effects of Invention

According to the present invention, based on a thermal decomposition method which is a typical method for producing metal oxides, by controlling the types of additives and reaction conditions, it is possible to produce novel single-phase wurtzite-type manganese oxide particles, which cannot be obtained by a conventional production method. This provides wurtzite-type manganese oxide particles useful as catalysts, materials for lithium batteries, contrast agents for MRI (magnetic resonance imaging), optoelectronics by photoelectric conversion, electronic materials, and the like.

DESCRIPTION OF EMBODIMENTS

Hereinafter, the wurtzite-type manganese oxide particles of the present invention and the method for producing the same will be described in detail.

<Novel Manganese Oxide Particles>

The theoretically known crystal systems of manganese oxides are the rock salt type (hereinafter referred to as RS type) and the wurtzite type (hereinafter referred to as WZ type), and the former exists stably in nature but the WZ-type manganese oxide particles produced in an isolated state are not known. As shown in Table 1, the WZ-type manganese oxide particles of the present invention are crystals having a hexagonal crystal structure and having a space group classified into P63mc, which is distinguished from the RS type having a cubic crystal system and belonging to the space group Fm-3m. The WZ-type manganese oxide of the present invention has the lattice constants of a=3.37±0.01 Å and c=5.36±0.01 Å, and is a novel WZ-type manganese oxide particle completely different from the hexagonal manganese oxide disclosed in PTL 1 (the lattice constants: a=8.73 Å and c=14.36 Å).

The RS-type manganese oxide particles are grayish-green but the novel WZ-type manganese oxide particles are red.

TABLE 1

|  | MnO Particle of the present invention | RS-type MnO particle |
|---|---|---|
| Crystal structure | Wurtzite-type structure (WZ) | Rock salt type structure (RS) |
| Crystal system | Hexagonal crystal (Tetrahedral coordination) | Cubic crystal (Octagonal coordination) |
| Space group | P63 mc | Fm-3m |
| Lattice constant | a = 3.376 Å c = 5.365 Å | a = 4.445 Å |
| Body-color | Red | Grayish-green |

The core-shell particles of the present invention have the above-mentioned WZ-type manganese oxide particles as a core and the surface thereof is covered with a thin layer of manganese dioxide. The manganese dioxide layer is a very thin layer of 1 nm or less and it is possible to prevent oxidation and phase transition of the WZ-type manganese oxide particles while maintaining substantially the same characteristics as the WZ-type manganese oxide particles and to retain WZ-type manganese oxide particles in a stable state. The core-shell particles of the present invention are produced by allowing the above-mentioned WZ-type manganese oxide particles to be left in an oxygen-containing atmosphere, for example, in the air, or by actively subjecting the surface to the oxidation treatment, and either method is included in the present invention.

The WZ-type manganese oxide particles of the present invention are materials having characteristics such as high conductivity, piezoelectric effect, pyroelectric effect, and second harmonic generation, which cannot be expressed by the RS-type manganese oxide having high symmetry, and, thus, can be expected to be applied in various fields. In particular, the WZ-type manganese oxide particles of the present invention can be produced as nanoparticles of 100 nm or less and can be applied to various uses of metal oxide nanoparticles.

Hereinafter, a method for producing WZ-type manganese oxide particles and core-shell particles of the present invention will be described.

The method for producing WZ-type manganese oxide particles is based on a thermal decomposition reaction of a compound containing manganese, a specific additive is added to the reaction system, and heat treatment is performed in multiple stages in a plurality of steps having different heating temperatures. One step is a step of forming a crystal nucleus (nucleation step), and the other step is a step of growing crystal particles (particle growth step). By appropriately controlling the types of additives and the reaction conditions (heating temperature, pressure, heating rate, and the like) of the two-step process, the formation of RS-type manganese oxide, layered double hydroxide (LDH), and the like can be prevented and it is possible to produce single-phase WZ-type manganese oxide particles that are substantially free of these by-products.

In the method for producing WZ-type manganese oxide particles of the present invention, an organic acid salt or a complex of manganese can be used as the manganese compound as a raw material for manganese and oxygen. Specifically, manganese stearate (st-Mn), manganese acetylacetonates such as $Mn(ACAC)_3$ and $Mn(ACAC)_2$, manganese acetate $(Mn(AC)_2)$, trioctylphosphine complex (TOP: Mn), and the like can be used. Among these, manganese stearate, which has the effect of suppressing growth by coordinating to the surface of the crystal particles in the process of growing, is particularly preferable.

As a reaction solvent, since the reaction is carried out at a relatively high temperature, a solvent having a boiling point (b.p.) higher than the reaction temperature is used.

Specifically, oleylamine (b.p.: 350° C.), benzyl benzoate (b.p.: 350° C.), 1-octadecene (b.p.: 179° C. (under 15 mmHg)), oleic acid (b.p.: 360° C.), trioctylphosphine oxide (b.p.: 202° C. (under 2 mmHg)), trioctylphosphine (b.p.: 445° C.), trioctylamine (b.p.: 367° C.), tribenzylamine (b.p.: 390° C.) can be used. In particular, oleylamine having a high boiling point is suitable. The concentration of the raw material is not particularly limited but is 0.1 to about 1.0 mol/1 (liter).

As the additive, a polyol-based material that is a reducing agent is used. Specifically, hexadecanediol, tetraethylene glycol, propylene glycol, trimethylene glycol, diethylene glycol, ethylene glycol, stearyl glycol, ethylene glycol stearate, and the like can be used alone or in a mixture of two or more. By adding such a reducing agent, the binding force can be enhanced due to the charge of Mn and O, and the conversion from the ionic octahedral coordination to the covalently binding tetrahedral coordination can be promoted.

Only the reducing agent described above may be used as the additive, but it is preferable to add a coordination agent that coordinates on the particle surface and suppresses the growth of the particles. Specifically, as the coordinator, trioctylphosphine (TOP) or trioctylphosphine sulfide (TOP:S) can be used. When trioctylphosphine sulfide is used, TOP and sulfur may be separately added to the reaction system.

By using two types of reducing agent and coordinating agent, the system in which the formation of RS type, which is easily formed, is suppressed and the formation of WZ type is dominant is maintained, at each stage of the reaction (nucleation and crystal growth).

The larger the amount of the additive, the more the formation of RS-type particles having a stable structure can be suppressed, but if the amount is excessive, the layered double hydroxide (LDH) incorporating Mn is formed. If even a small amount of LDH is generated in the particle synthesis process, LDH grows rapidly and not only inhibits the growth of WZ-type particles but also coexists as a by-product, so that the yield of WZ-type particles is significantly reduced. The specific amount of the additive varies depending on the type of the additive, the concentration of the raw material, and other reaction conditions, but for example, the amount of the reducing agent (for example, ethylene glycol) is preferably 100 mol % or more and 1000 mol % or less with respect to Mn. If the amount of the reducing agent is less than 100 mol % with respect to the Mn material, the Mn material cannot be sufficiently reduced, so that the ion-binding RS-type MnO tends to preferentially precipitate. On the other hand, when the amount of the reducing agent exceeds 1000 mol %, the water concentration derived from the reducing agent increases in the reaction system, the amount of LDH produced increases, and the yield of WZ-type manganese oxide decreases. However, LDH has a significantly different particle size than the WZ-type manganese oxide particles produced. For example, WZ-type manganese oxide particles are 100 nm or less, while LDH is about several μm. Therefore, since it can be easily separated by post-reaction treatment (classification) or the like, the amount only needs to be sufficient to suppress the formation of RS-type manganese oxide particles if the yield is not taken into consideration.

When ethylene glycol having a relatively low boiling point is used as the reducing agent, the amount thereof is preferably 10 vol % or less with respect to the entire solvent. If the amount of the reducing agent having a low boiling point relative to the solvent is large (for example, if it exceeds 10 vol %), bumping occurs in the depressurizing step, and the additive concentration distribution in the reaction solvent tends to be uneven. As a result, RS-type MnO may be precipitated at a low additive concentration, and LDH may be precipitated at a high additive concentration, and thus, WZ-type MnO having a single composition may not be obtained.

As for the coordinator, when trioctylphosphine sulfide is used, the ratio (molar ratio) of TOP to sulfur is 2:1 and the amount of TOP is preferably 100 mol % to about 200 mol % based on the amount of the reducing agent.

Figure 1:
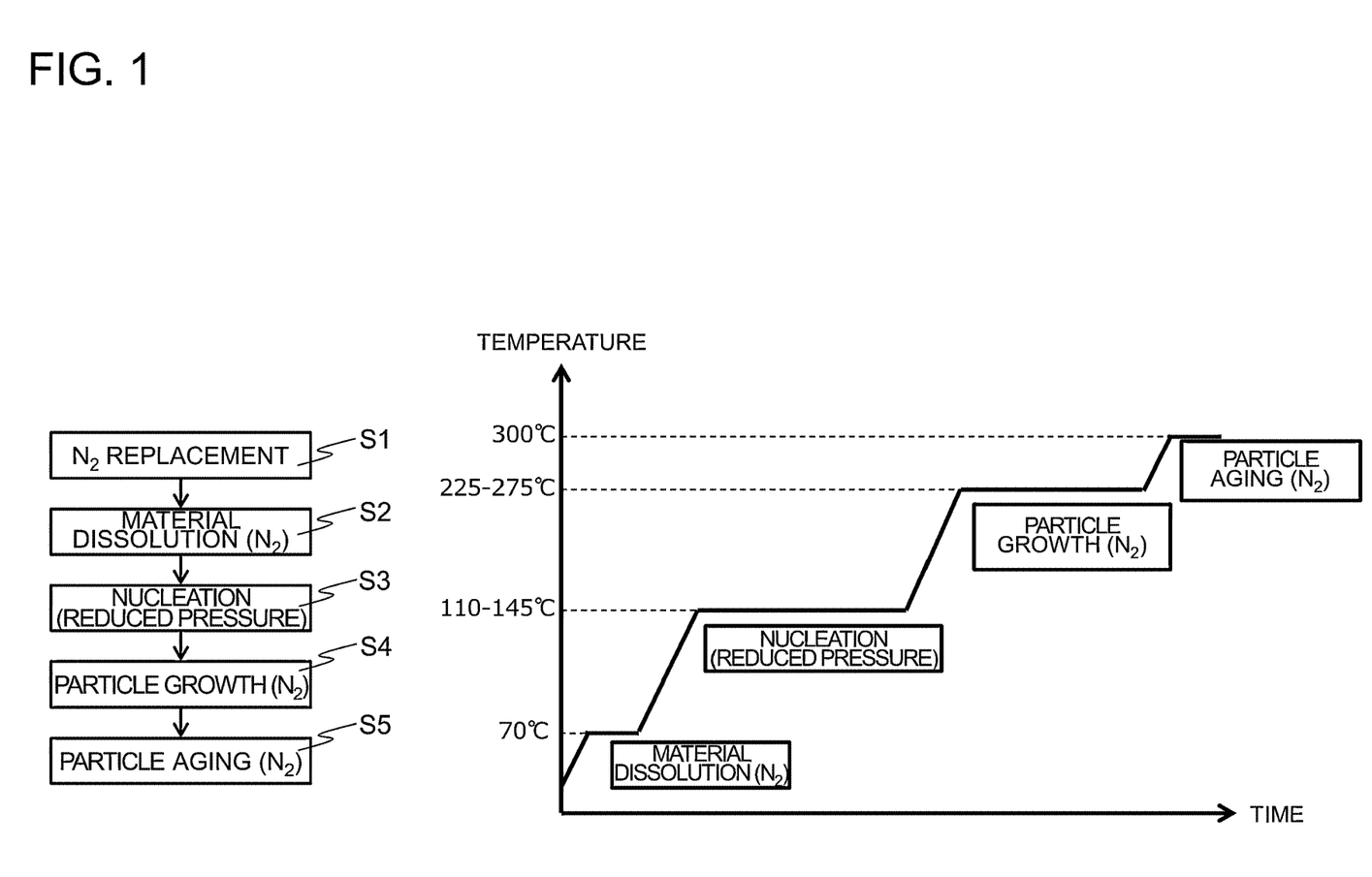
FIG. 1 is a diagram showing an example of the method for producing a wurtzite-type manganese oxide of the present invention.

Next, each step of the method for producing WZ-type manganese oxide particles of the present invention will be described in detail with reference to FIG. 1.

The reaction is carried out in an inert gas atmosphere such as $N_2$ or a reduced pressure atmosphere. First, the solvent, Mn raw material, and the reducing agent are put into the reaction vessel, the air in the reaction system including the reaction vessel is replaced with an inert gas (S1), the coordinator is put into the reaction vessel, and then the material is dissolved in the solvent (S2). This step for dissolving the material may be carried out by heating at a temperature of 100° C. or lower. The time for dissolution is not particularly limited but is 1 hour or less, about 30 minutes.

Next, the temperature of the reaction system is raised while reducing the pressure, and the reaction in the nucleation step (first step) is carried out (S3). In the nucleation step, the growth of RS-type manganese oxide particles, which have a stable structure, rapidly progresses if there is an excess oxygen source, and LDH is formed if water, which is a material-derived or reaction by-product, is present in the reaction system. Therefore, the pressure is reduced to remove excess oxygen and water existing in the atmosphere and water derived from the material or a reaction by-product. Specifically, the pressure is 1000 Pa or less, preferably 100 Pa or less, and more preferably 20 Pa or less. However, if the pressure is too low, the polyol-based material as a reducing agent evaporates from the reaction system and cannot contribute to the reaction, so the pressure is preferably more than 10 Pa. In addition, if the reaction temperature is high during the nucleation process, RS-type manganese oxide tends to grow. Therefore, the nucleation step is set to a temperature equal to or lower than the temperature at which RS-type manganese oxide is produced, specifically, 200° C. or lower, preferably 110 to 150° C., and more preferably 115 to 145° C.

Under the above-mentioned temperature range and reduced pressure reaction conditions, the pressure exceeds the vapor pressure of the polyol material as an additive, for example, ethylene glycol, but in a closed reaction system, the state of reflux and contributing to the reaction is maintained, and it is thus considered that the above-mentioned effect as a reducing agent is sustained. Further, since the additive is added at the time of dissolving the material, it is considered that the additive functions as a reducing agent from the initial stage of the reaction.

The reaction time varies depending on the temperature and pressure, but is preferably 1 hour to 3 hours, more preferably about 2 hours. The heating rate from the material dissolution S2 to the nucleation step S3 is not particularly limited but is 10° C. to about 30° C./min.

The particle growth step (second step) S4 grows particles in an inert gas atmosphere (normal pressure) at a temperature higher than that in the nucleation step. If the reaction temperature in the particle growth step is too high, RS-type crystals are likely to be formed, and if the reaction temperature is too low, LDH is likely to be formed. Specifically, the reaction temperature is 225° C. to 275° C., preferably 230° C. to 260° C. Further, when the heating rate from the nucleation step is high, the WZ-type crystal generated in the nucleation step is easily converted into the RS-type crystal. Therefore, the heating rate is preferably 30° C./min or less, and more preferably 10° C./min or less.

Even in the process of particle growth, the additive functions as a reducing agent, and if a coordinator (second additive) that coordinates on the particle surface is contained, the coordinator coordinates on the particle surface so that the rapid growth of particles can be prevented and only WZ-type crystals grow. However, if the content of the additive at this stage is too large, LDH is likely to be produced. Therefore, as described above, the amount of the additive is preferably an amount that prevents the production of LDH.

The reaction time of the particle growth step varies depending on the scale of the reaction system, but is, for example, 1 minute to about 24 hours. In this particle growth step, WZ-type manganese oxide crystals grow into nanoparticles of several nm to about 30 nm. After the particle growth step, a step (S5) of further raising the temperature to age the particles may be added. By lengthening the reaction time to some extent or providing an aging step, dissolution and re-emergence occur in which the small particles are dissolved and incorporated into the large particles, and as a result, the size becomes uniform. The aging step S5 is preferably carried out at a temperature of 300° C. or lower for 30 minutes or less, for example, about 15 minutes.

After the reaction is completed, the crystal particles can be recovered by adding an organic solvent such as hexane to the reaction solution and then adding ethanol or the like as a poor solvent to aggregate the particles. The addition of the organic solvent and the aggregation due to the poor solvent may be repeated a plurality of times. The obtained crystal particles are hexagonal crystals similar to wurtzite, have a red color, and have a particle size of 100 nm or less.

Although the method for producing WZ-type manganese oxide of the present invention has been described above with reference to FIG. 1, FIG. 1 is an example of the production method, and the method for producing WZ-type manganese oxide particles of the present invention is not limited to the specified temperature and time shown in FIG. 1.

EXAMPLE

Hereinafter, examples of the method for producing WZ-type manganese oxide particles of the present invention will be described.

Example 1

10 mL of oleylamine as a solvent, 1.5 mmol of manganese stearate (st-Mn) as a manganese material, 3.0 mmol of ethylene glycol (EG) as a reducing agent (first additive), and TOP 3.6 mmol and sulfur 1.8 mmol as a coordinator (second additive) were used.

After charging the container (100 mL) with the material, the material was kept at 70° C. for 30 minutes in a nitrogen atmosphere, then heated and maintained at 140° C. for 2 hours in a reduced pressure atmosphere (nucleation). The pressure at this time was about 100 Pa. Then, the temperature was raised to 250° C. at a heating rate of 50° C./5 min (10° C./min), and the temperature was maintained at 250° C. for 2 hours in an $N_2$ atmosphere (crystal growth). After that, the temperature was further raised, and the temperature was maintained at 300° C. for 15 minutes in an $N_2$ atmosphere for synthesis (crystal aging).

After the temperature is lowered, 5 ml of hexane was added to the reaction solution, and the mixture was stirred and then collected in a centrifuge tube. The particles were aggregated by adding ethanol, which is a poor solvent, and settled using a centrifuge. The separation condition was 12,000 rpm for 60 minutes. After discarding the supernatant, 5 mL of hexane was added and stirred with a shaker for 30 minutes to disperse the particles. Ethanol was added again, and the same process was repeated once more to wash the particles to obtain red MnO particles.

Comparative Example 1

MnO particles were produced in the same manner as in Example 1 except that no additive was added. If no additive was added, the color of the particles was grayish-green, and the appearance was clearly different from that of the MnO particles of Example 1.

Figure 2:
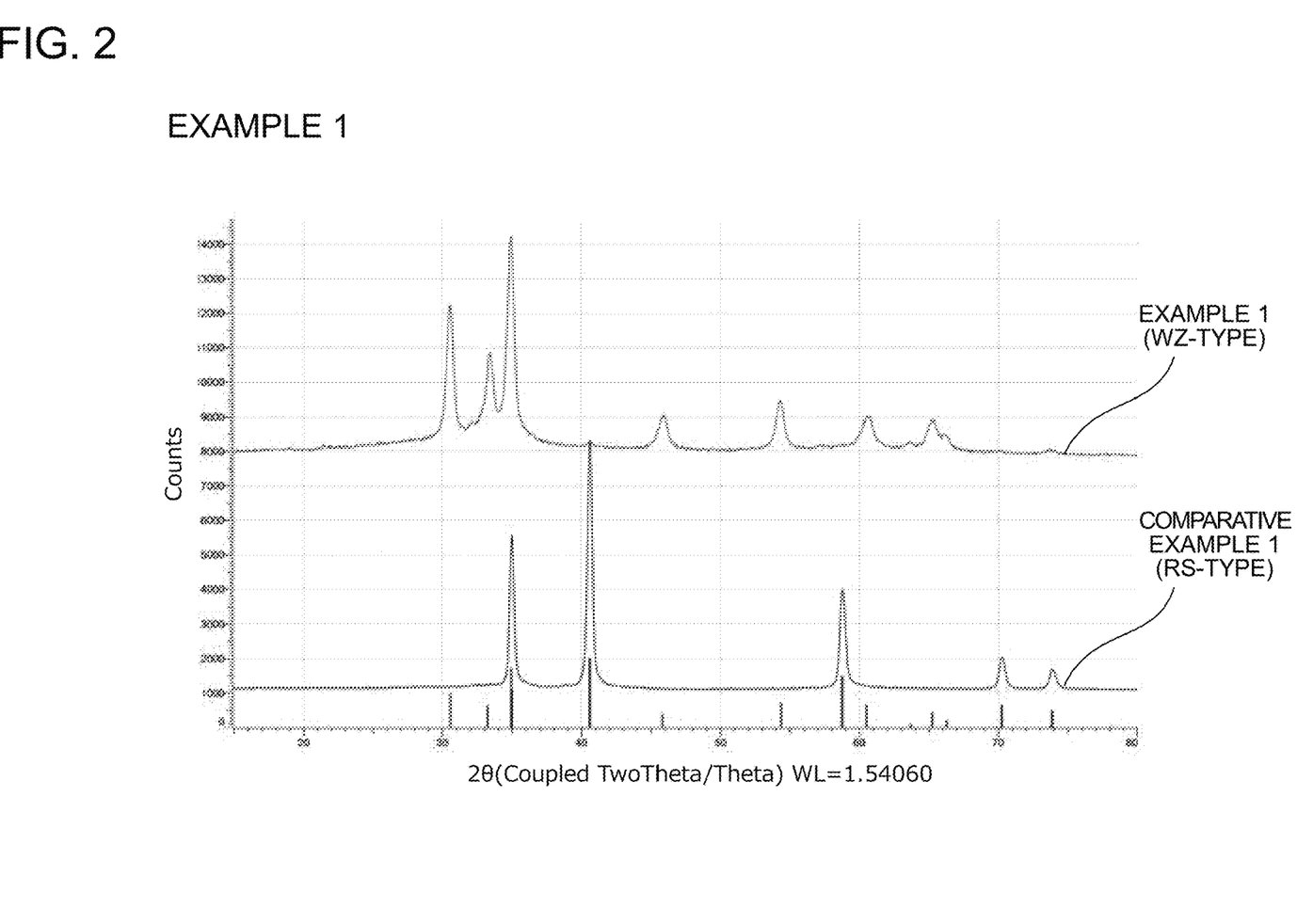
FIG. 2 is a diagram showing XRD patterns of MnO particles of Example 1 and Comparative Example 1.
Figure 3:
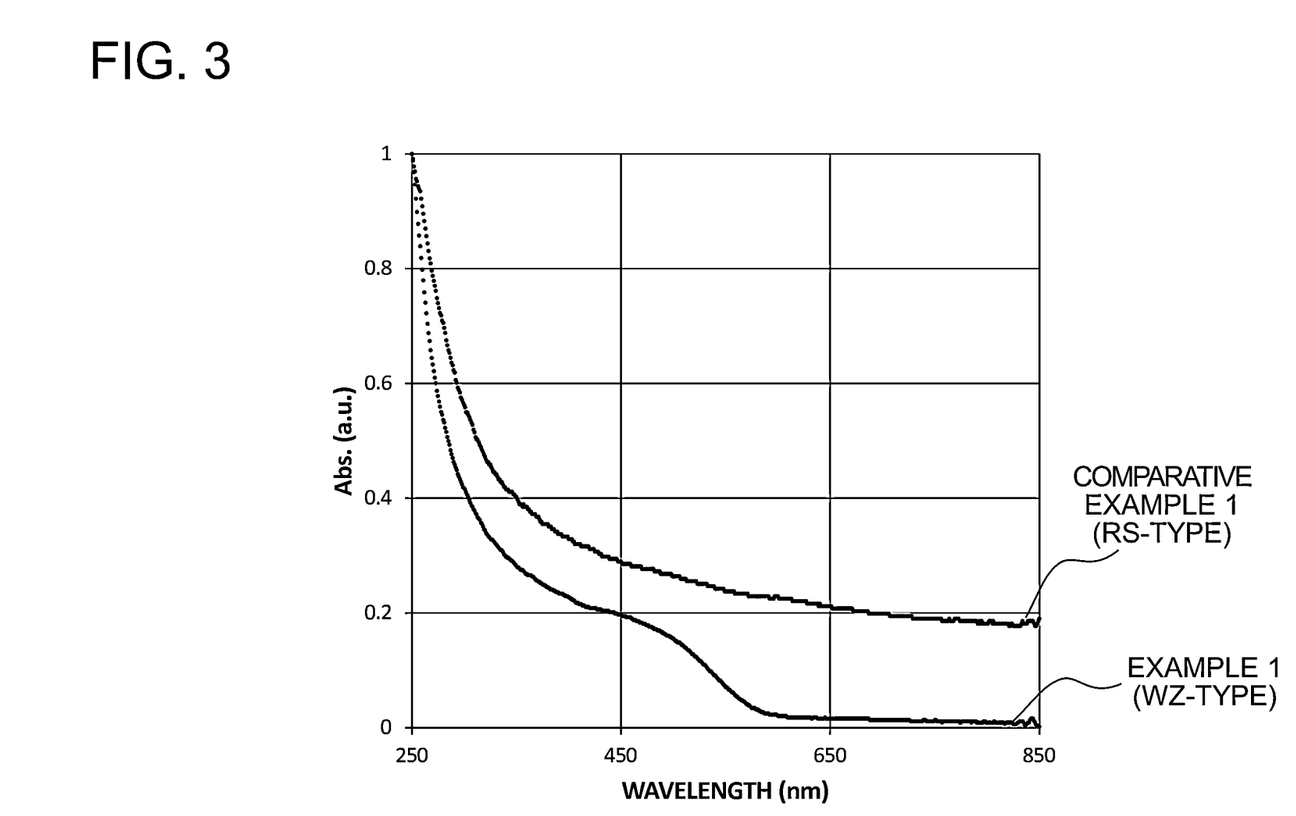
FIG. 3 is a graph showing the absorbance of MnO particles of Example 1 and Comparative Example 1.

The XRD measurement results of the particles obtained in Example 1 and Comparative Example 1 are shown in FIG. 2, and the optical properties (absorbance of ultraviolet light-near infrared light) are shown in FIG. 3. In the XRD pattern of FIG. 2, the MnO particles (upper side) of Example 1 were observed to have a peak at the same position as the theoretical value of the peak (2θ(degrees)) of the WZ-type MnO, which confirms to be the WZ type. Further, no peak overlapping with the peak of RS-type MnO was observed, which confirms that only WZ-type particles were produced.

On the other hand, the MnO (lower side) of Comparative Example 1 was observed to have a peak at the same position as the peak theoretical value (2θ(degrees)) of the RS type MnO, which confirms to be the RS type. That is, it was confirmed that the addition of the additive can produce only the WZ type.

Figure 4:
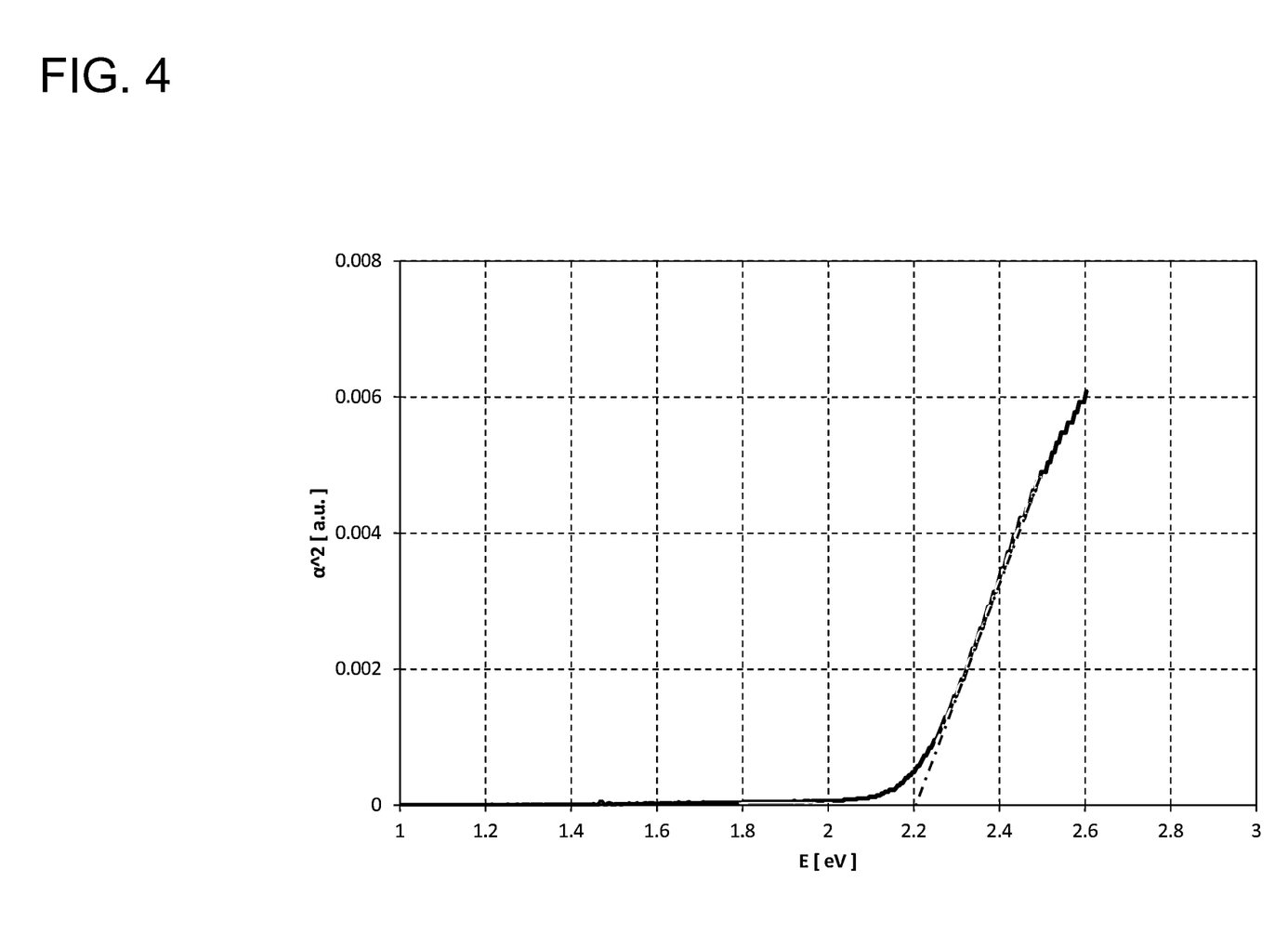
FIG. 4 is a graph showing an absorption coefficient-energy curve calculated from the absorbance of Example 1 of FIG. 3.

From the results of the absorbance measurement shown in FIG. 3, it was confirmed that the MnO particles of Example 1 had almost no absorbance at a wavelength of about 600 nm or more, which was different from the absorbance of the RS-type MnO particles exhibiting grayish-green color. The result of converting the absorbance into an energy (1/wavelength)—absorption coefficient curve is shown in FIG. 4. As shown in FIG. 4, the absorption edge of the MnO particles of Example 1 was 2.2 eV, that is, 564 nm.

Figure 5:
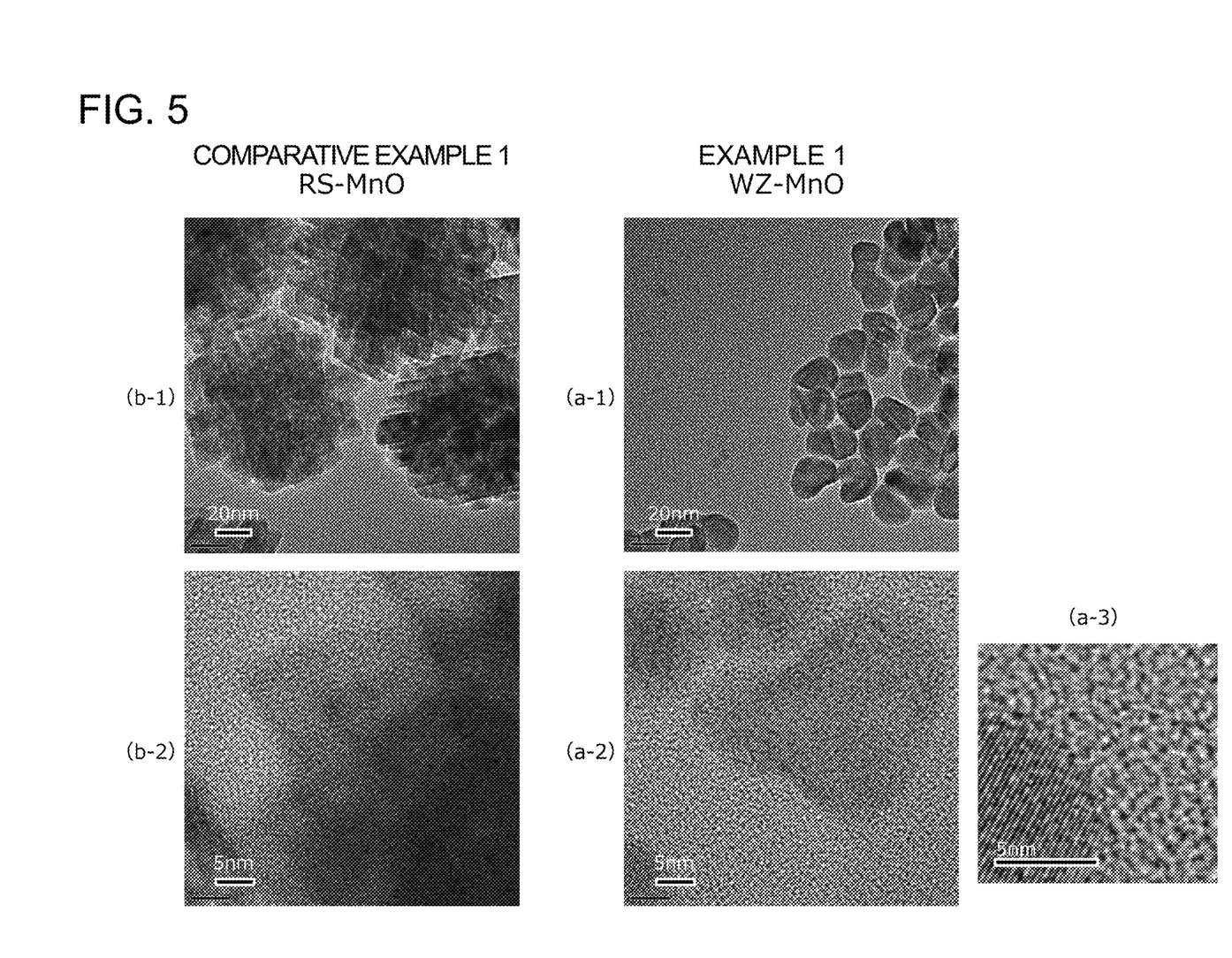
FIG. 5 is a diagram showing TEM images of Example 1 and Comparative Example 1, in which (a1) to (a3) show Example 1 and (b1) and (b2) show Comparative Example 1.

Further, TEM images of the particles of Example 1 and Comparative Example 1 are shown in FIGS. 5. (a-1) to (a-3) in FIG. 5 show Example 1, and (b-1) and (b-2) show Comparative Example 1. As can be seen from the comparison between the TEM images (a-1) and (b-1) on the largest scale, the RS-type MnO particles of Comparative Example 1 are in the form of secondary particles in which angular primary particles are overlapped, whereas the WZ-type MnO particles of Example 1 were nanoparticles having a shape close to a spherical shape and having a particle size of about 20 nm or less. Further, in (a-3), in which a part of one particle shown in (a-2) is enlarged, the crystal structure of the particle can be observed and it is confirmed that a single crystal is formed, that is, another crystal system is not mixed.

Example 2

Figure 6:
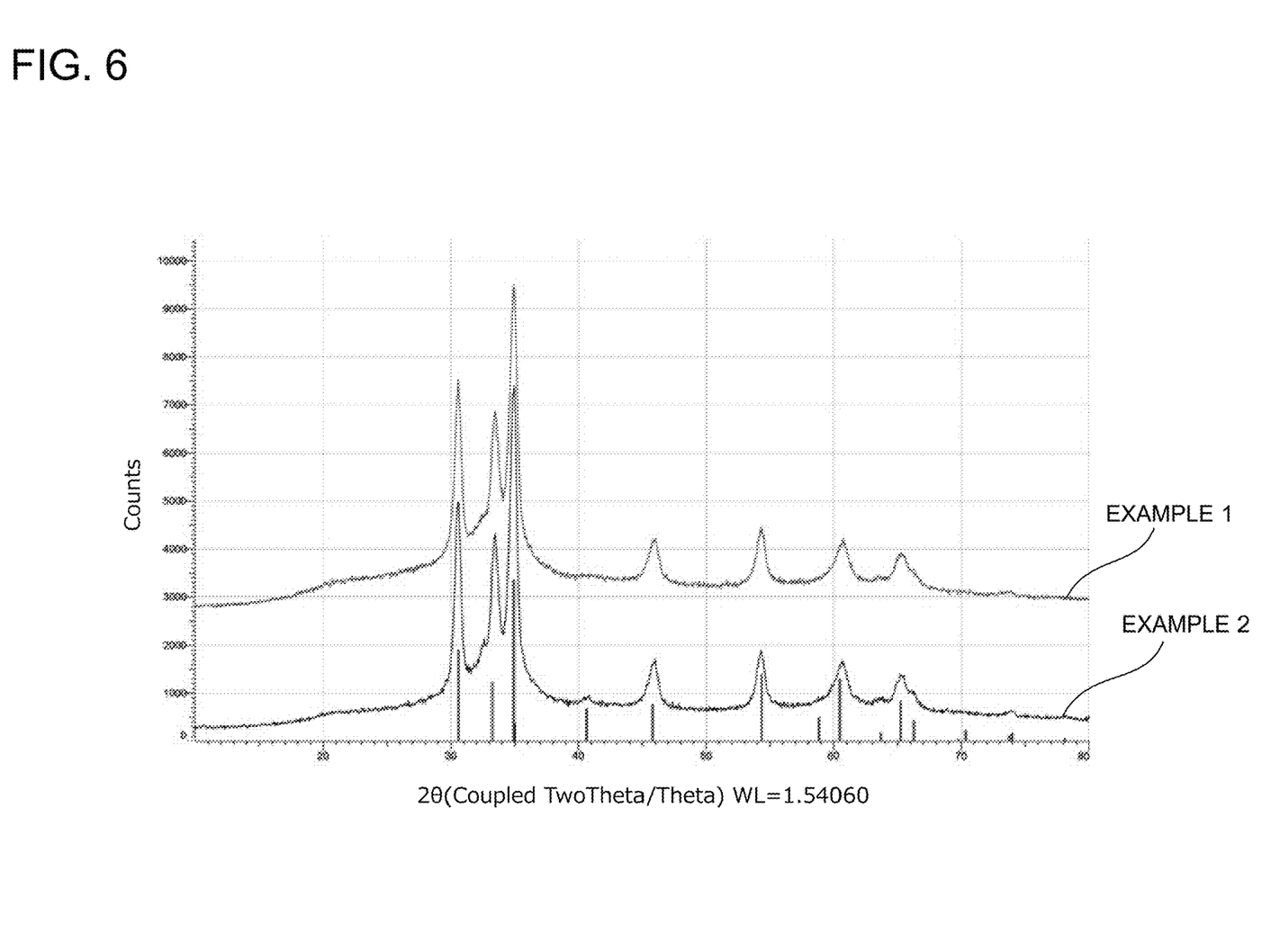
FIG. 6 is a diagram showing an XRD pattern of MnO particles of Example 2.

Manganese oxide was synthesized in the same manner as in Example 1 except that only 3.0 mmol of ethylene glycol (EG) was used as an additive. The XRD measurement result of the manganese oxide particles obtained by the synthesis is shown in FIG. 6. FIG. 6 also shows the XRD measurement results of Example 1 for reference.

As shown in the drawing, it was confirmed that WZ-type manganese oxide particles can be obtained with high purity even when only ethylene glycol is used.

Example 3

Experiments were conducted by changing the temperature, heating rate, and amount of additives in each step, and the conditions under which single-phase WZ-type MnO particles could be obtained without contamination with other by-products were investigated.

Experimental Example 1: Temperature of Nucleation Step

The types and amounts of the Mn raw material, additives (reducing agent and coordinator), and solvents were the same as in Example 1, and the same reaction as in Example 1 was carried out while changing the temperature of the nucleation step between 110° C. and 145° C. to synthesize MnO particles.

Experimental Example 2: Amount of Additive

The reaction was carried out to synthesize MnO particles under the same conditions as in Example 1 except that the temperature of the nucleation step was set to 130° C., the addition amounts of the first additive (ethylene glycol) and the second additive (TOP:S) were changed as shown in Table 2. In Table 2, the addition amount is shown in mol % with respect to 1 mmol of Mn amount.

TABLE 2

|        | Ethylen Glycol | TOP | S   |
|--------|----------------|-----|-----|
| Case 1 | 3.33           | 4.0 | 2.0 |
| Case 2 | 2.0            | 2.4 | 1.2 |
| Case 3 | 1.67           | 2.0 | 1.0 |
| Case 4 | 1.33           | 1.6 | 0.8 |
| Case 5 | 0.67           | 0.8 | 0.4 |

Experimental Example 3: Temperature of Particle Growth Step

The same reaction as in Example 1 was carried out to synthesize MnO particles under the conditions that the types and amounts of the Mn raw material, additives (reducing agent and coordinator), and solvent are the same as in Example 1, and the temperature of the particle growth step is changed between 225° C. and 275° C. in Example 1.

Experimental Example 4: Heating Rate in Particle Growth Step

The same reaction as in Example 1 was carried out except that the heating rate from the nucleation step to the particle growth step was changed to 5° C./min and 35° C./min to synthesize MnO particles.

Figure 7:
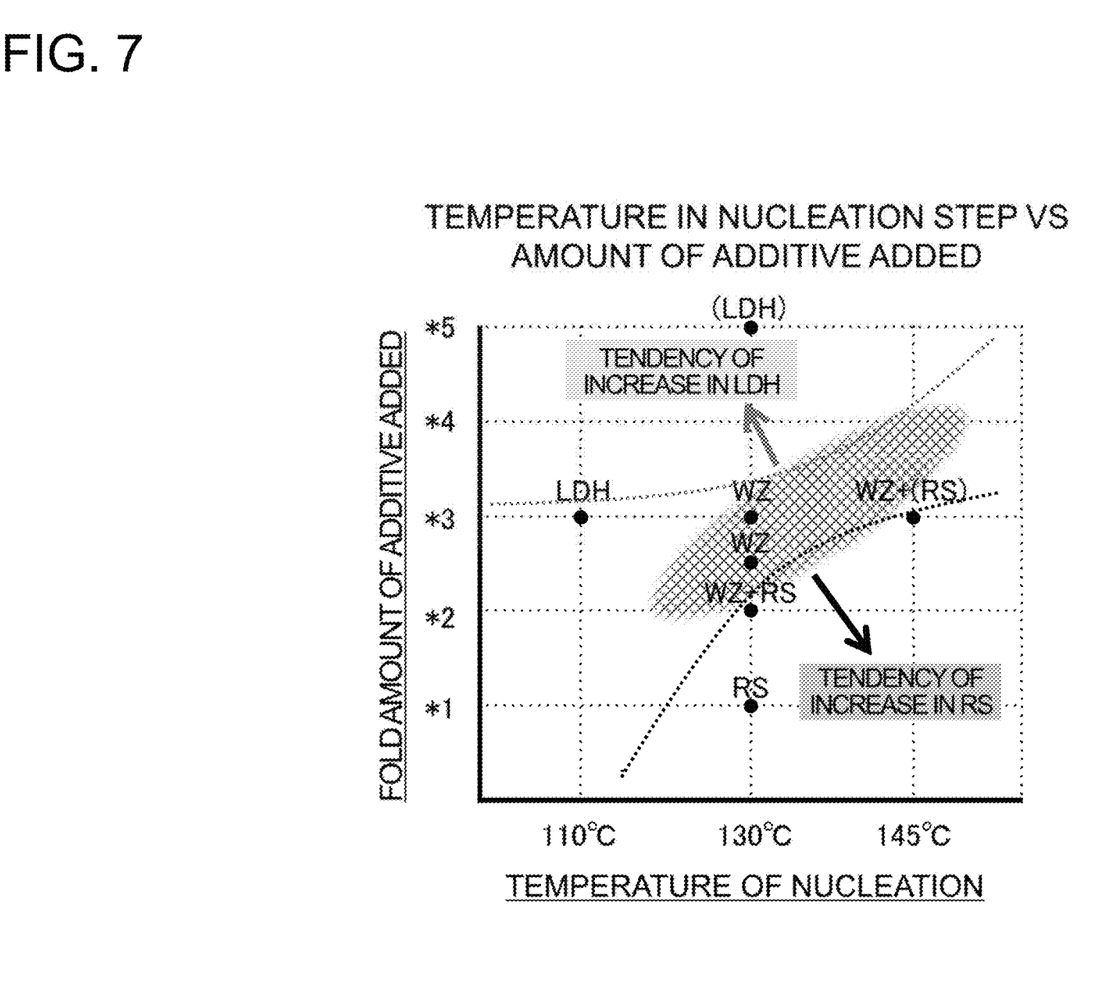
FIG. 7 is a diagram showing the results of an experimental example of reaction condition optimization for producing single-phase WZ-type MnO particles.

From the results of Experimental Example 1 and Experimental Example 2, FIG. 7 shows a map showing the reaction conditions (temperature in the nucleation step, amount of additive added) from which WZ-type MnO particles can be obtained. In FIG. 7, the horizontal axis represents the temperature of the nucleation step, and the vertical axis represents the amount of the additive added, which is a multiple of ethylene glycol (EG) 1 mmol (and TOP 1.2 mmol) as a reference. In the drawing, the upper and lower dotted two lines show the critical lines estimated from the experimental results where single-phase WZ-type particles are obtained, the upper critical line is the boundary with the range in which LDH is produced, and the lower critical line is the boundary with the range in which RS-type particles are produced. It is estimated that the range indicated by the net line is approximately the range in which single-phase WZ-type particles can be produced.

As can be seen from FIG. 7, if the amount of the additive is small, the tendency of the increase in the RS-type particles was observed, and if the amount of the additive is large, the tendency of the increase in the LDH was observed. Further, if the reaction temperature at the nucleation stage is high, the tendency of the increase in the RS-type particles was observed. However, it is observed that even if the amount added is small (for example, even if it is 1 time), when the reaction temperature is low, the formation of RS-type particles can be prevented and single-phase WZ-type particles can be produced, and even if the reaction temperature is relatively high, the production of RS-type particles can be prevented and single-phase WZ-type particles can be produced by increasing the addition amount within the range in which LDH is not formed.

Figure 8:
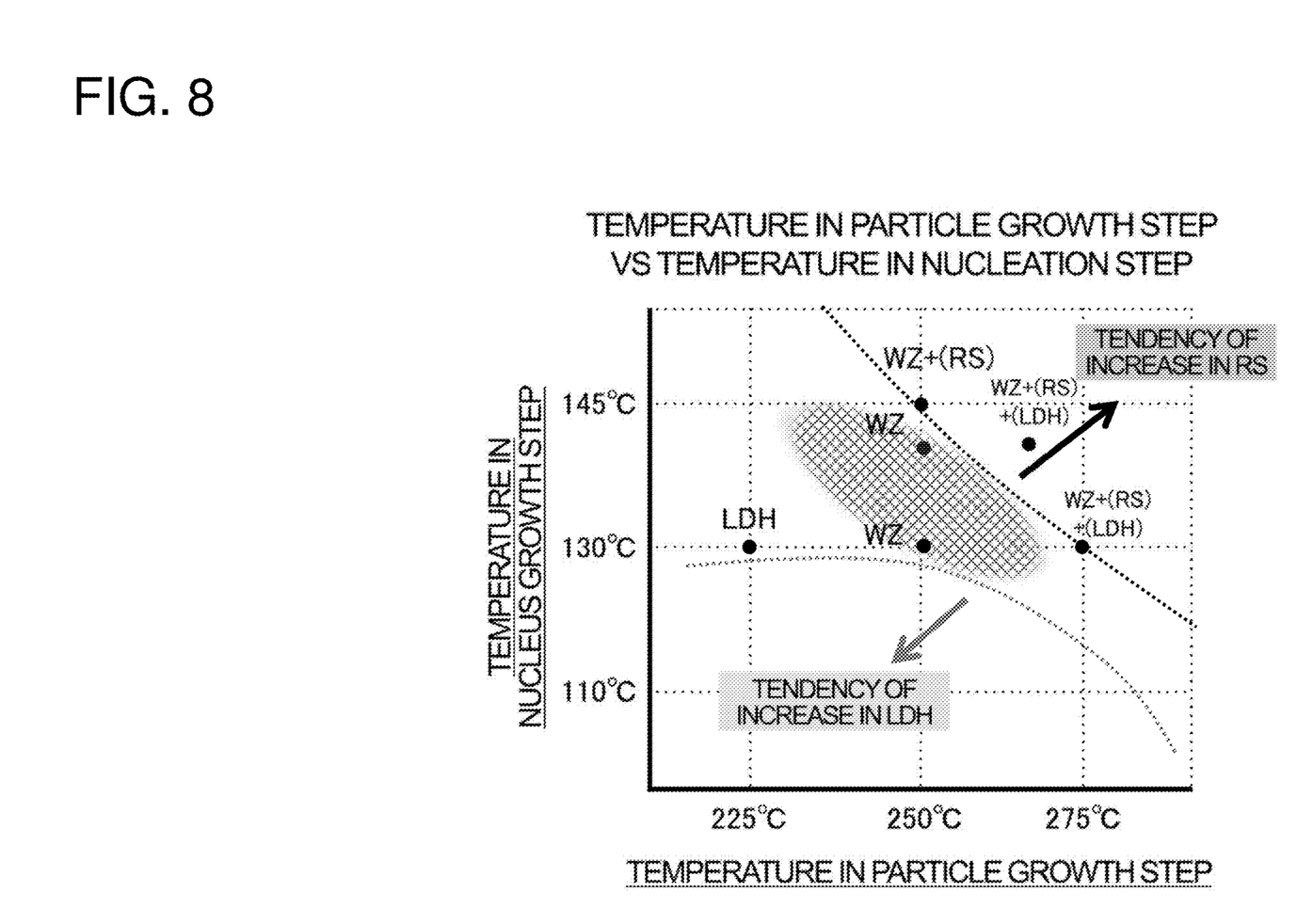
FIG. 8 is a diagram showing the results of an experimental example of reaction condition optimization for producing single-phase WZ-type MnO particles.

From the results of Experimental Example 1 and Experimental Example 3, FIG. 8 shows a map showing the reaction conditions (temperature in the nucleation step and temperature in the particle growth step) in which WZ-type MnO particles can be obtained. In FIG. 8, the horizontal axis is the temperature in the particle growth step and the vertical axis is the temperature in the nucleation step, and the critical line estimated from the experimental results where single-phase WZ-type particles are obtained is shown by dotted lines. As can be seen from FIG. 8, in both the nucleation step and the particle growth step, the RS-type particles tend to increase as the temperature rises, but even if the temperature in the particle growth step is high, the single-phase WZ-type particles can be produced by lowering the temperature in the nucleation step within the range where LDH is not produced, and even if the temperature in the nucleation step is high, the single-phase WZ-type particles can be produced by lowering the temperature in the particle growth step within the range where LDH is not produced. Therefore, under the above-mentioned reaction conditions, it is presumed that the range indicated by the net line in the drawing is approximately the range in which single-phase WZ-type MnO particles can be produced.

Figure 9:
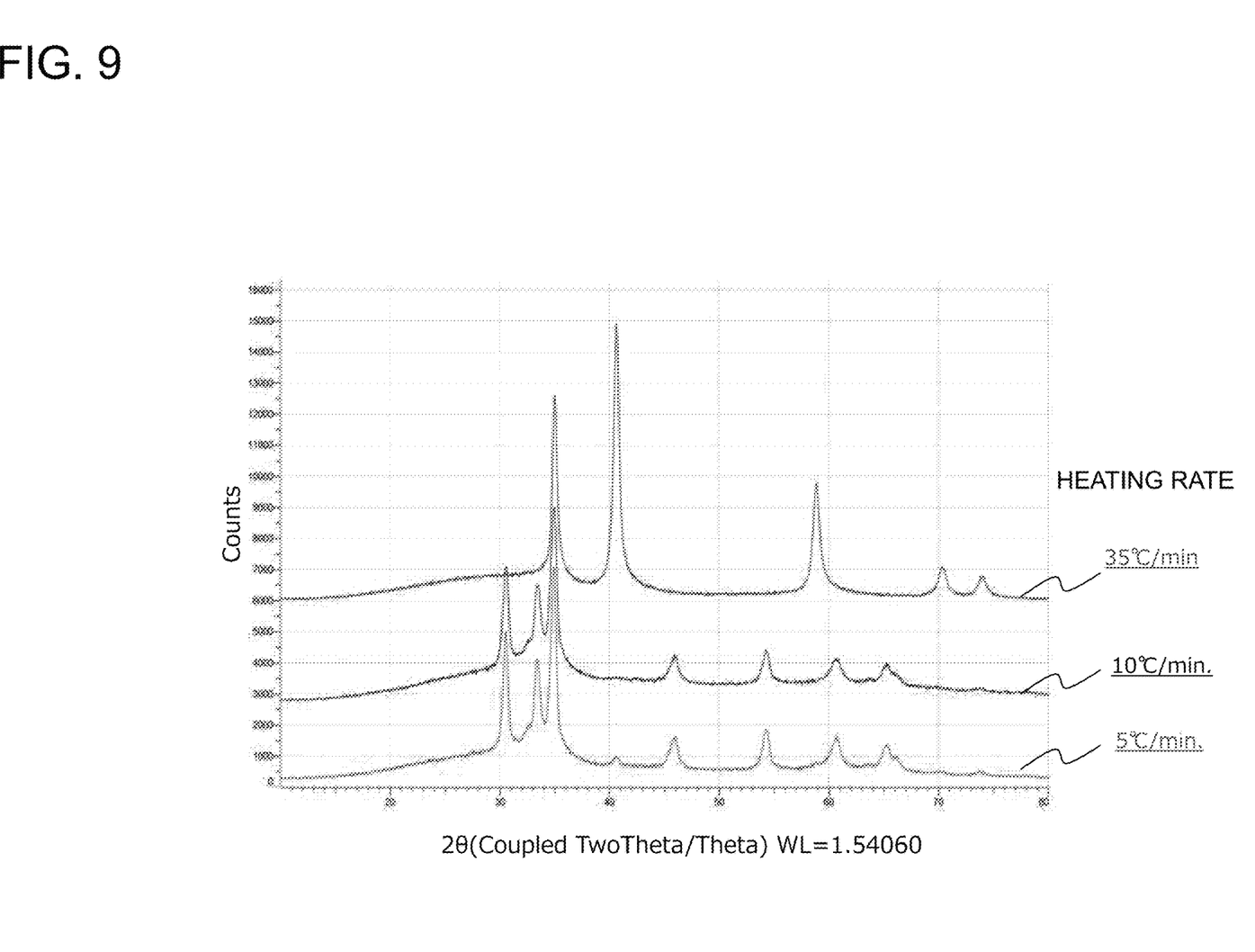
FIG. 9 is a diagram showing an XRD pattern of MnO particles when the heating rate is changed.

FIG. 9 shows the results of XRD measurement of the MnO particles obtained in Experimental Example 4. FIG. 9 also shows the XRD of the MnO particles obtained in Example 1 (heating rate: 10° C./min) for reference. As shown in the drawing, it was confirmed that if the heating rate is low, WZ-type MnO particles are produced, but if the heating rate is high, conversion of WZ-type to RS-type generated during nucleation occurs, and WZ-type is difficult to be prepared. That is, it can be seen that control of the heating rate is important for preparing single-phase WZ-type MnO particles.

Example 4

After the reaction was carried out in the same manner as in Example 1 to synthesize Mn particles, an oxygen-nitrogen mixed gas having an oxygen concentration of 10% or less was supplied to about 11 ml of the reaction solution at a rate of 350 to 450 ml/min for oxidation after the temperature was lowered. Then, as in Example 1, a solvent (hexane) is added, stirred, and collected in a centrifuge tube, and the treatment of aggregating the particles by adding a poor solvent (ethanol) and settling the particles using a centrifuge is repeated twice to obtain MnO particles. The particles had a black color similar to that of manganese dioxide.

Figure 10:
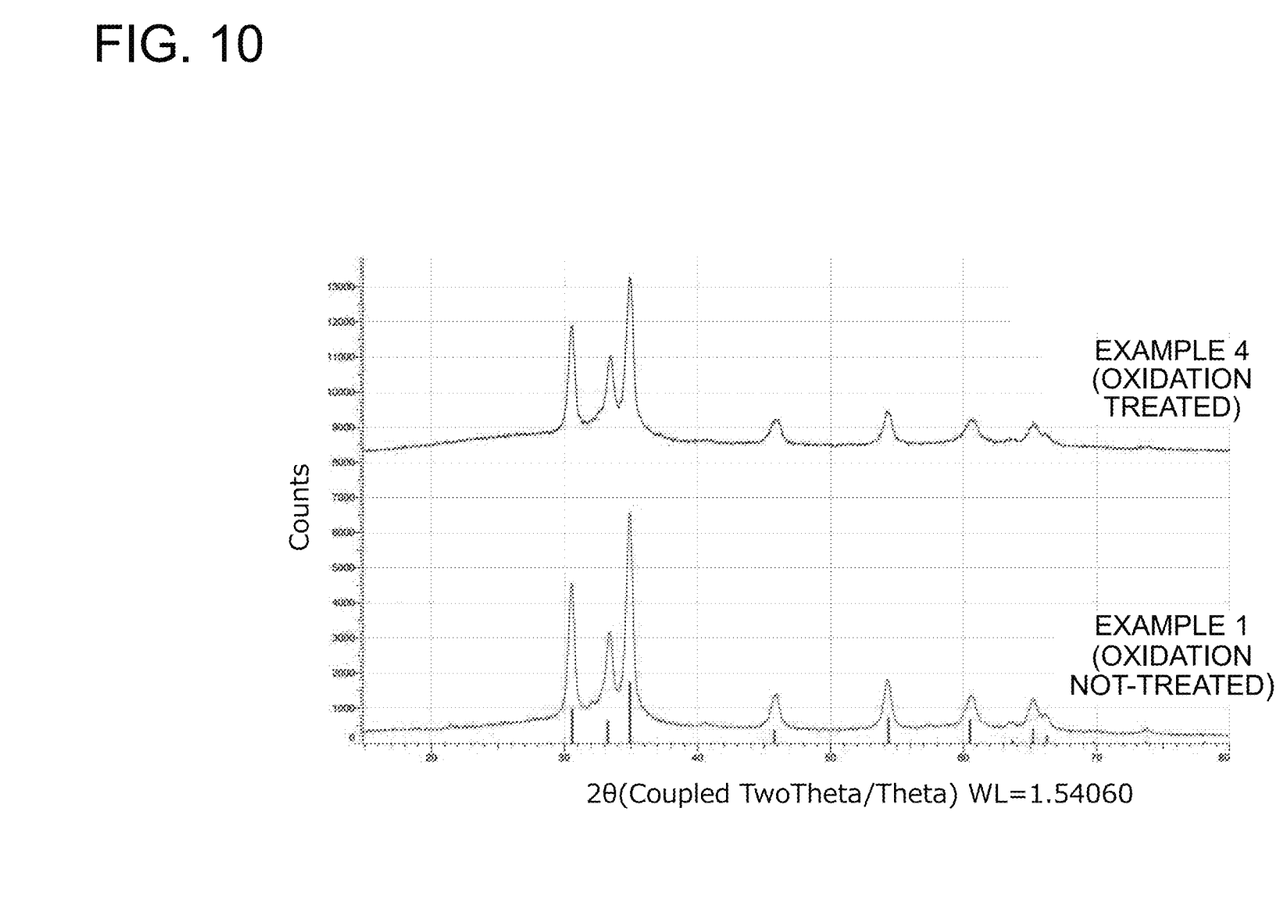
FIG. 10 is a diagram showing an XRD pattern of MnO particles of Example 4.
Figure 11:
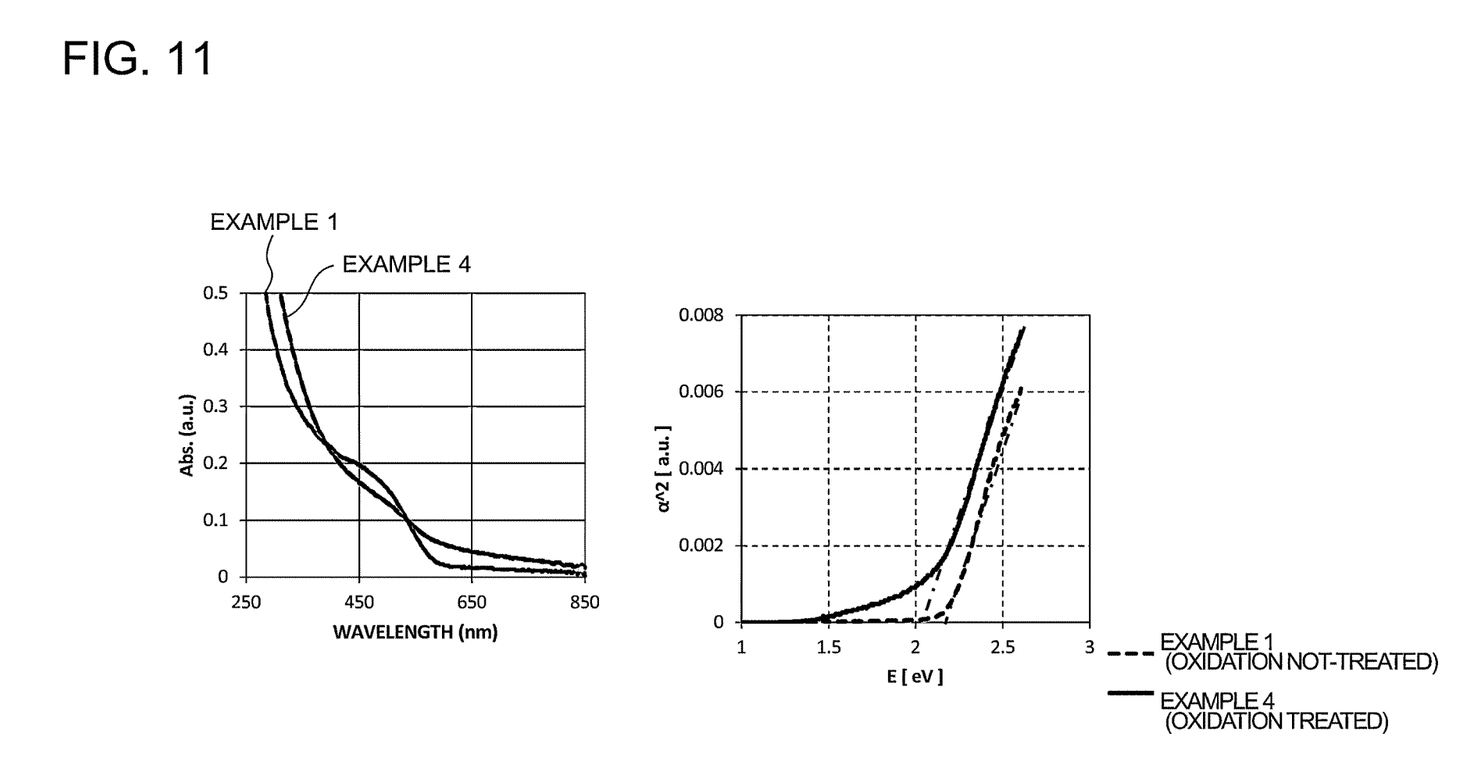
FIG. 11 is a graph showing the absorbance of MnO particles of Example 4 and a graph showing an absorption coefficient-energy curve.

The obtained particles were subjected to XRD measurement and optical property (absorbency) measurement. The respective results are shown in FIGS. 10 and 11. FIGS. 10 and 11 also show the results of MnO particles (not oxidized) of Example 1 for reference.

As can be seen from the XRD chart of FIG. 10, it was confirmed that the MnO particles obtained in Example 4 were also WZ-type MnO particles, similar to the MnO particles of Example 1. Further, as can be seen from the absorbance in FIG. 11, the particles of Example 1 have an absorption edge of about 600 nm and are red, whereas the particles of Example 4 have an absorption edge of about 800 to 900 nm and have different optical properties from the particles of Example 1. From these XRD measurement and absorbance results, it has been found that in Example 4, there are core-shell type particles in which the WZ-type MnO particles, which are substantially the same as in Example 1, are covered with a very thin film made of a material having different optical properties.

Figure 12:
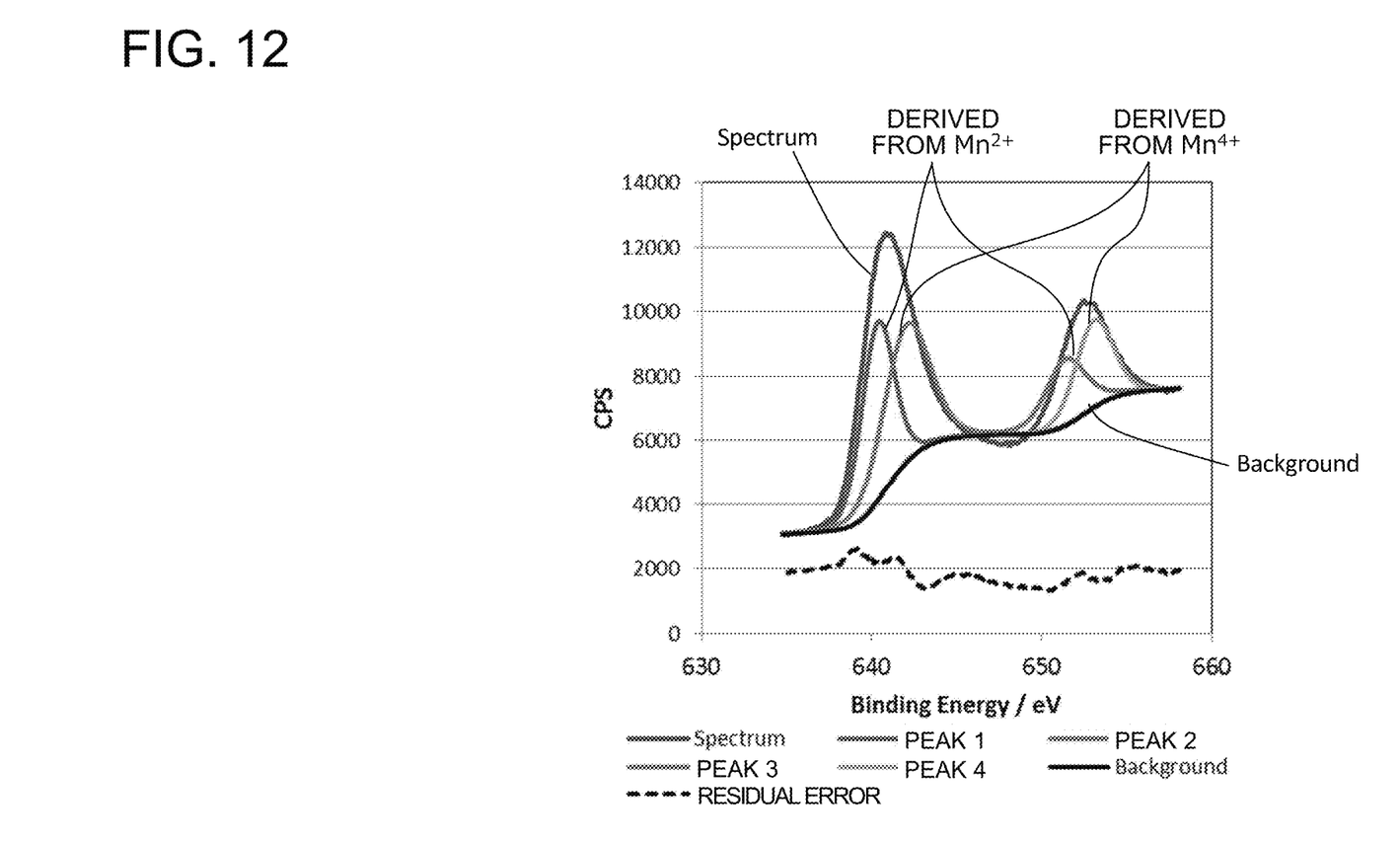
FIG. 12 is a graph showing XPS measurement results of MnO particles of Example 4.

Furthermore, XPS measurement was performed to determine the material forming this film. As a result, as shown in FIG. 12, a peak derived from Mn2+ and a peak derived from Mn4+ were observed, and it was confirmed that the film was manganese dioxide ($MnO_2$) However, since the peak indicating manganese dioxide does not appear in XRD, the thickness of the film is estimated to be extremely thin, 1 nm or less.

By forming the core-shell type particles in which the surface of the WZ-type MnO particle is covered with chemically stable $MnO_2$ as in the present Example 4, it is possible to prevent the MnO particles from changing over time and to apply stable MnO particles for use of MnO particles.

INDUSTRIAL APPLICABILITY

According to the present invention, novel manganese oxide particles useful as catalysts, materials for lithium batteries, contrast agents for MRI (magnetic resonance imaging), optoelectronics by photoelectric conversion, electronic materials, and the like are provided. Further, a novel method for producing novel manganese oxide particles is provided.

The invention claimed is:

1. Single-phase manganese oxide particles having a wurtzite crystal structure,
wherein the single-phase manganese oxide particles are not provided on a carbon template.

2. The manganese oxide particles according to claim 1, wherein lattice constants are a=3.37±0.01 Å and c=5.36±0.01 Å.

3. The manganese oxide particles according to claim 1, wherein a particle size is 100 nm or less.

4. The manganese oxide particles according to claim 1, wherein a particle size is 30 nm or less.

5. The manganese oxide particles according to claim 1, exhibiting a red color.

6. The manganese oxide particles according to claim 1, wherein an absorption edge is 600 nm or less.

7. Core-shell manganese oxide particles comprising:
the manganese oxide particles according to claim 1 as cores of the core-shell manganese oxide particles; and
a manganese dioxide ($MnO_2$) film is formed on a surface of the cores.

8. The core-shell manganese oxide particles according to claim 7, wherein the manganese dioxide film has a thickness of 1 nm or less.

9. A method for producing the single-phase manganese oxide particles having a wurtzite crystal structure according to claim 1, by thermally decomposing a compound containing manganese, the method comprising:
a first step of adding a reducing agent consisting of at least one of a polyol-based material and an ethylene glycol stearate-based material as an additive to a reaction system and heating the reaction system at a first temperature under a reduced pressure atmosphere; and
a second step of raising the temperature after the first step and heating the reaction system at a temperature higher than the first temperature in an inert gas atmosphere.

10. The method according to claim 9, wherein the first temperature is higher than a boiling point of the polyol-based material under the reduced pressure atmosphere.

11. The method according to claim 9, wherein the additive further contains a second additive that suppresses particle size.

12. The method according to claim 11, wherein the second additive is trioctylphosphine or trioctylphosphine sulfide.

13. The method according to claim 9, wherein an amount of the additive added is 100 mol % or more and 1000 mol % or less with respect to an amount of manganese in a raw material.

14. The method according to claim 9, wherein the first step is performed at more than 10 Pa and 100 Pa or less.

15. The method according to claim 9, wherein a heating rate from the first temperature to the second temperature is 30° C./min or less.

16. The method according to claim 9, further comprising:
a step of forming a manganese dioxide film on a surface of the produced manganese oxide particles.

17. Core-shell manganese oxide particles comprising:
single-phase manganese oxide particles having a wurtzite crystal structure, as cores of the core-shell manganese oxide particles; and
a manganese dioxide ($MnO_2$) film formed on a surface of the cores,
wherein the manganese dioxide film has a thickness of 1 nm or less.

* * * * *